(12) United States Patent
Whiting

(10) Patent No.: US 7,231,767 B2
(45) Date of Patent: Jun. 19, 2007

(54) FORCED AIR COOLING SYSTEM

(75) Inventor: Michael Owen Whiting, St.Bruno de Montarville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 116 days.

(21) Appl. No.: 10/825,138

(22) Filed: Apr. 16, 2004

(65) Prior Publication Data

US 2005/0229602 A1   Oct. 20, 2005

(51) Int. Cl.
  *F02C 7/18* (2006.01)
  *F02C 7/32* (2006.01)
  *F02K 3/00* (2006.01)

(52) U.S. Cl. .................. 60/772; 60/266; 60/39.83; 60/39.08

(58) Field of Classification Search ............. 60/39.08, 60/266, 39.83, 204; 184/6.11
See application file for complete search history.

(56) References Cited

U.S. PATENT DOCUMENTS

| 2,487,842 | A | * | 11/1949 | Whiteman et al. ......... 60/39.08 |
| 2,706,255 | A | | 4/1955 | Breaux et al. |
| 4,722,666 | A | | 2/1988 | Dennison et al. |
| 4,825,643 | A | | 5/1989 | Hennecke et al. |
| 4,887,424 | A | * | 12/1989 | Geidel et al. ............. 60/39.08 |
| 4,999,994 | A | | 3/1991 | Rüd et al. |
| 5,105,875 | A | | 4/1992 | McArthur |
| 5,163,285 | A | | 11/1992 | Mazeaud et al. |
| 5,265,408 | A | | 11/1993 | Sheoran et al. |
| 5,414,992 | A | | 5/1995 | Glickstein |
| 5,655,359 | A | | 8/1997 | Campbell et al. |
| 5,987,877 | A | * | 11/1999 | Steiner ..................... 60/39.08 |
| 6,092,360 | A | | 7/2000 | Hoag et al. |
| 6,282,881 | B1 | * | 9/2001 | Beutin et al. ............. 60/39.08 |
| 6,450,447 | B1 | | 9/2002 | Konrad et al. |
| 6,578,351 | B1 | | 6/2003 | Modafferi |
| 6,615,576 | B2 | | 9/2003 | Sheoran et al. |
| 6,651,929 | B2 | * | 11/2003 | Dionne ...................... 60/39.08 |

* cited by examiner

*Primary Examiner*—Ted Kim
(74) *Attorney, Agent, or Firm*—Ogilvy Renault LLP

(57) ABSTRACT

A forced air cooling system for an APU comprising at least an oil cooler, a plenum in fluid communication with the oil cooler, and a compressor rotated by a rotating shaft of the APU such that the compressor and rotating shaft rotate at a same speed, the rotating compressor inducing a cooling air flow through the oil cooler. A method for cooling an auxiliary power unit is also provided.

21 Claims, 2 Drawing Sheets

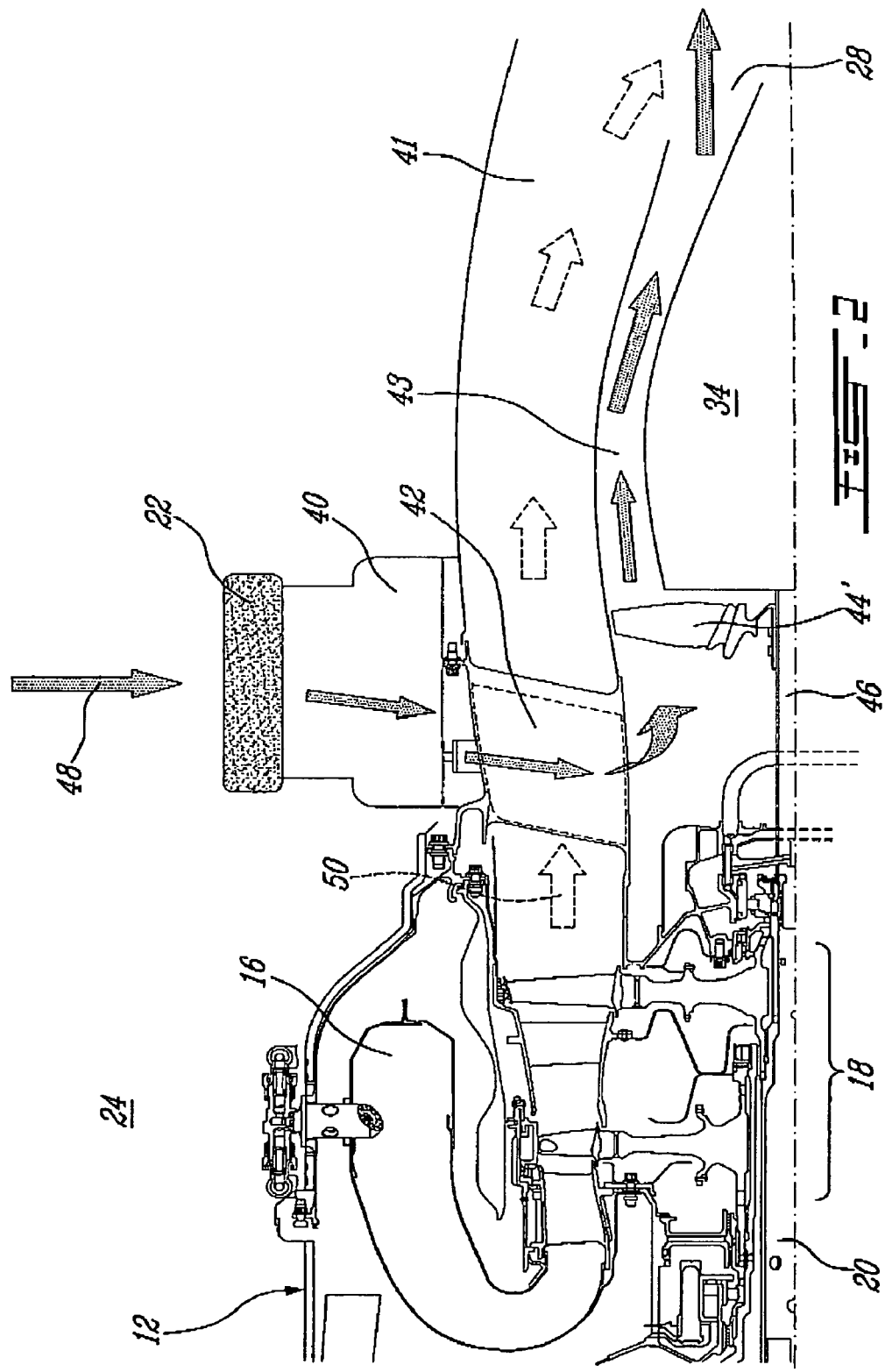

FORCED AIR COOLING SYSTEM

TECHNICAL FIELD

The present invention relates to gas turbine engines, and most particularly to cooling systems for such engines that are used as auxiliary power units on airplanes.

BACKGROUND OF THE INVENTION

Auxiliary power units require a certain amount of cooling air to cool the engine.

Active cooling systems typically comprise an active fan used to push air through the oil cooler and across auxiliary power unit components. These fans are driven at high speeds by the APU through a complex shaft and gear assembly.

Accordingly, there exists a need for an improved auxiliary power unit cooling system which is reliable and of relatively simple construction.

SUMMARY OF THE INVENTION

It is therefore an aim of the present invention to provide an improved cooling system for an auxiliary power unit on an airplane.

Therefore, in accordance with the present invention, there is provided a forced air cooling system for an APU housed within a compartment, the forced air cooling system comprising: at least one inlet opening for providing air to an oil cooler; an exhaust opening in the compartment; the oil cooler being located in the compartment; a plenum in fluid communication with the exhaust opening, and with the oil cooler; and a compressor rotated by a rotating shaft of the APU such that the compressor and rotating shaft rotate at a same speed, the rotating compressor induces a cooling air flow through the oil cooler.

Also in accordance with the present invention, there is provided a gas turbine engine comprising: at least one rotating shaft; at least a first compressor rotated by the rotating shaft; a combustor in fluid communication with the first compressor, the combustor producing an exhaust flow; at least one turbine in fluid communication with the combustor, the turbine extracting energy from the exhaust flow and driving the rotating shaft; an oil cooler receiving lubrication oil from at least the turbine section in a closed circuit; an exhaust opening in fluid communication with the turbine section for evacuating the exhaust flow; a cooling air passage providing serial communication between the oil cooler and the exhaust opening; and an auxiliary compressor directly driven by the rotating shaft, the auxiliary compressor being located downstream of the turbine and within the cooling air passage, the auxiliary compressor reducing an air pressure between the auxiliary compressor and the oil cooler, thereby inducing a cooling air flow through the oil cooler and out of the exhaust opening.

Further in accordance with the present invention, there is provided a method for cooling a gas turbine engine, the method comprising the steps of: rotating a turbine section of the gas turbine engine such as to drive a rotating shaft; flowing oil lubricating parts of at least the turbine section of the gas turbine engine through an oil cooler; driving an auxiliary compressor with the rotating shaft, the auxiliary compressor being located downstream of the turbine section; generating a pressure differential between opposed sides of the oil cooler with the compressor; inducing a cooling air flow through the oil cooler with the pressure differential; and cooling the oil within the oil cooler with the cooling air flow, thereby cooling the gas turbine engine.

Further details of these and other aspects of the present invention will be apparent from the detailed description and Figures included below.

BRIEF DESCRIPTION OF THE DRAWINGS

Reference is now made to the accompanying Figures depicting aspects of the present invention, in which:

FIG. 2 is a partial cross sectional schematic illustration showing an alternative to the forced air cooling system of FIG. 1.

DETAILED DESCRIPTION OF THE PREFERRED EMBODIMENT

Figure 1:
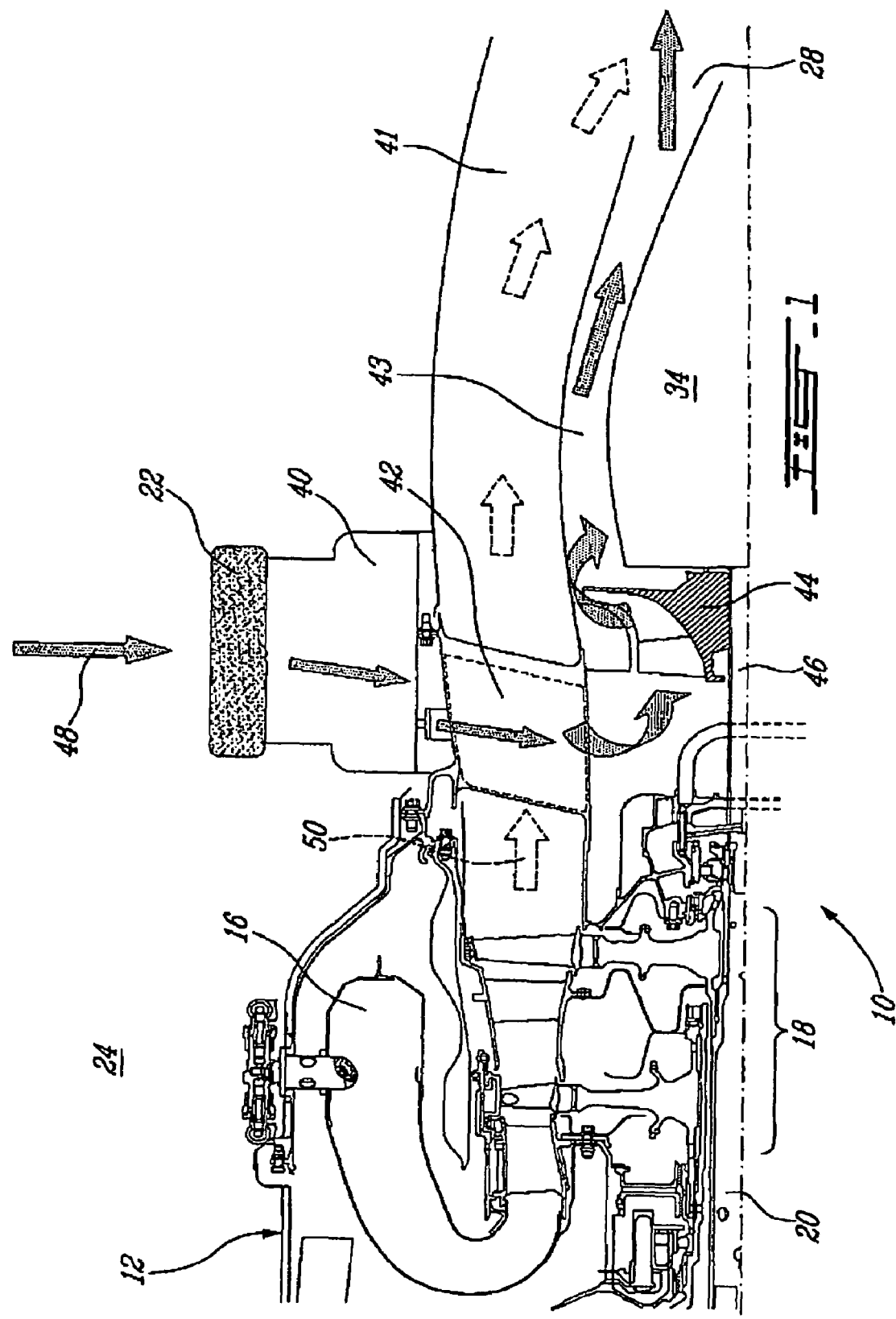
FIG. 1 is a partial cross sectional schematic illustration of a forced air cooling system of the auxiliary power unit installation in accordance with the present invention.

Referring to FIG. 1, an auxiliary power unit (APU) installation comprising the elements of the present invention is generally indicated at 10. The APU installation 10 is principally comprised of a gas turbine engine or power plant 12 generally including in serial flow communication a compressor for pressurizing air, a combustor 16 in which the compressed air is mixed with fuel and ignited for generating an annular stream of hot combustion gases, and a turbine section 18 for extracting energy from the combustion gases. A rotating shaft or shafts 20 extends within the power plant 12 and transfers energy from the turbine section 18 to the compressor, the load compressor (not shown) and the electrical generators (not shown). The APU installation 10 also includes an oil cooler 22. The oil cooler 22 is an oil to air heat exchanger through which oil lubricating various elements of the power plant 12 is circulated for cooling, of any appropriate type and geometry.

Both the gas turbine power plant 12 and the oil cooler 22 are located within an auxiliary power unit compartment 24. The oil cooler 22 may be ducted to the outside of the compartment, or may draw air from the compartment, or elsewhere. This compartment 24 is defined for the purposes of the present invention as any dedicated enclosed compartment or enclosure, generally although not essentially located within the aircraft tailcone. The compartment 24 is preferably an aft compartment in the aircraft which is at least partly defined by an aircraft exterior skin surface (not shown).

The exterior skin surface of the compartment 24 includes a rear exhaust opening 28 and a main air inlet opening (not shown). The main air inlet opening in the exterior skin surface allows air to be drawn from outside the aircraft by the power plant compressor (not shown), which can include a load compressor and a core compressor, and provides air to the aircraft environmental control system (ECS) and the gas turbine power plant 12. This air is directed from the main air inlet opening to the compressor by an air inlet duct. Exhaust gas from the power plant 12 is evacuated through the rear exhaust opening 28.

The oil cooler 22 is provided with cooling air through a first inlet (not shown). The nature and configuration of the inlet and the means by which cooling air is supplied to the oil cooler is not material to this invention.

Referring to FIG. 1, the exhaust flow reaches the rear exhaust opening 28 through an annular exhaust passage 41. Exhaust struts 42 are provided across the exhaust passage 41 for structural reinforcement. A cone 34, concentric with the exhaust passage 41, is located upstream of the exhaust opening 28, such that an annular cooling passage 43 is defined between the cone 34 and the exhaust passage 41. A plenum 40 extends around a casing of the power plant 12 immediately upstream of the cone 34 and is radially aligned with a row of the exhaust struts 42. The plenum 40 is in fluid communication with the oil cooler 22. The plenum 40 is also in fluid communication with the cooling passage 43 through the exhaust struts 42, such that the cooling air flow can go through the exhaust passage 41 without being mixed with the exhaust flow. The exhaust passage 41 and the annular cooling passage 43 merge upstream of the exhaust opening 28, at the downstream extremity of the cone 34, such that the exhaust flow and cooling flow are evacuated together. It is also considered to provide separate exhaust openings for the exhaust flow and the cooling flow.

A high efficiency centrifugal impeller 44 is supported on an impeller shaft 46 which extends coaxially with the rotating-shaft 20 of the power plant 12, downstream of the turbine section 18. The impeller 44 can be an auxiliary centrifugal compressor impeller. The impeller shaft 46 is keyed onto the rotating shaft 20 such that the impeller 44 turns at the same speed as the turbine of the power plant. The impeller 44 is located immediately upstream of the cone 34, generally in axial alignment with the plenum 40, i.e. the plenum 40 extends around the impeller 44. Depending on the power plant configuration, the impeller 44 can be either cantilevered from a turbine bearing (not shown), straddle-mounted between the turbine bearing and a second bearing (not shown), or the turbine bearing can be moved downstream of the impeller 44. In any event, no gear train is required for driving the impeller 44, which provides for a simple design with high reliability due to a limited number of components.

The impeller 44, rotated directly by the power plant 12, will pressurize the air in the cooling air passage 43, which will be evacuated through the exhaust opening 28 together with the exhaust flow of the power plant 12. The impeller 44 will thus reduce the air pressure in the plenum 40. The pressure differential across the oil cooler 22, induced by the compressor 44, will force air through the oil cooler 22. This cooling air flow is illustrated in the Figures by the reference numeral 48 while the exhaust flow is indicated by the reference numeral 50.

This arrangement will thus create a flow of cooling air through the oil cooler 22, thereby providing oil cooling through heat exchange between the air and oil. The cooling air volume flow can be adjusted by proper selection of the profile of the impeller 44. Optionally, the present invention may also be used to draw cooling air into the compartment for external cooling of the APU components.

In addition to being efficient, compact and simple, the described system presents an additional advantage. Since the impeller discharge pressure will be slightly higher than the turbine exhaust pressure, the exhaust velocity will be greater. This higher velocity will tend to accelerate the turbine exhaust flow and so lower the engine back pressure which will cause a lower engine back pressure. This will improve the overall efficiency of the gas turbine power plant.

Referring to FIG. 2, an alternative embodiment of the cooling system is presented. This embodiment is similar to the previous embodiment described, with like elements being represented by like reference numerals. However, the auxiliary centrifugal compressor impeller 44 is replaced by an axial compressor 44 '. This system presents the above-mentioned advantages over the prior systems.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

The invention claimed is:

1. A forced air cooling system for an APU housed within a compartment, the forced air cooling system comprising:
   at least one inlet opening for providing air to an oil cooler;
   an exhaust opening in the compartment;
   the oil cooler being located in the compartment;
   a plenum in fluid communication with the exhaust opening and with the oil cooler; and
   a compressor rotated by a rotating shaft of the APU such that the compressor and rotating shaft rotate at a same speed, the rotating compressor induces a cooling air flow through the oil cooler.

2. The forced air cooling system according to claim 1, wherein the exhaust opening also evacuates an exhaust flow of the APU.

3. The forced air cooling system according to claim 2, wherein a cooling passage provides the fluid communication between the plenum and the exhaust opening, and an exhaust passage merges with the cooling passage upstream of the exhaust opening and downstream of the compressor, the exhaust passage receiving the exhaust flow of a gas turbine engine.

4. The forced air cooling system according to claim 3, wherein the exhaust and cooling passages are annular and concentric, the cooling passage being located radially inward of the exhaust passage, and the plenum is connected to the cooling passage through hollow struts extending across the exhaust passage.

5. The forced air cooling system according to claim 1, wherein the compressor is a centrifugal compressor.

6. The forced air cooling system according to claim 1, wherein the compressor is an axial compressor.

7. The forced air cooling system according to claim 1, wherein the plenum is annular and located around a casing of a gas turbine engine.

8. The forced air cooling system according to claim 1, wherein the compartment is at least partially defined by an outer skin of an aircraft, and the inlet opening is provided in the outer skin.

9. The forced air cooling system according to claim 1, wherein the inlet opening is provided in an inlet duct delivering air to a at least one of a load compressor and a core compressor of a gas turbine engine.

10. The forced air cooling system according to claim 1, wherein the compressor is supported on a second shaft which is coaxial with the rotating shaft of a gas turbine engine.

11. The forced air cooling system according to claim 1, wherein the compressor is substantially aligned with the plenum along an axial direction of the rotating shaft.

12. A gas turbine engine comprising:
   at least one rotating shaft;
   at least a first compressor rotated by the rotating shaft;
   a combustor in fluid communication with the first compressor, the combustor producing an exhaust flow;
   at least one turbine in fluid communication with the combustor, the turbine extracting energy from the exhaust flow and driving the rotating shaft;

an oil cooler receiving lubrication oil from at least the turbine in a closed circuit;

an exhaust opening in fluid communication with the turbine for evacuating the exhaust flow;

a cooling air passage providing serial communication between the oil cooler and the exhaust opening; and an auxiliary compressor directly driven by the rotating shaft, the auxiliary compressor being located downstream of the turbine and within the cooling air passage, the auxiliary compressor reducing an air pressure between the auxiliary compressor and the oil cooler, thereby inducing a cooling air flow through the oil cooler and out of the exhaust opening.

13. The gas turbine engine according to claim 12, wherein the auxiliary compressor is a centrifugal compressor.

14. The gas turbine engine according to claim 12, wherein the auxiliary compressor is an axial compressor.

15. The gas turbine engine according to claim 12, wherein the cooling air flow coming out of the exhaust opening is sufficiently pressurized to reduce a back pressure of the gas turbine engine.

16. The gas turbine engine according to claim 12, wherein an exhaust passage provides the fluid communication between the turbine and the exhaust opening, the cooling air passage being located radially inward of the exhaust passage, and the exhaust passage and the cooling air passage merge upstream of the exhaust opening and downstream of the auxiliary compressor.

17. The gas turbine engine according to claim 12, wherein the auxiliary compressor is driven by the rotating shaft through a second shaft which is coaxial with the rotating shaft.

18. The gas turbine engine according to claim 12, wherein the gas turbine engine is an auxiliary power unit in an aircraft.

19. A method for cooling a gas turbine engine, the method comprising the steps of:

rotating a turbine section of the gas turbine engine such as to drive a rotating shaft;

flowing oil lubricating parts of at least the turbine section of the gas turbine engine through an oil cooler;

driving an auxiliary compressor with the rotating shaft, the auxiliary compressor being located downstream of the turbine section;

generating a pressure differential between opposed sides of the oil cooler with the compressor;

inducing a cooling air flow through the oil cooler with the pressure differential; and cooling the oil within the oil cooler with the cooling air flow, thereby cooling the gas turbine engine.

20. The method according to claim 19, further comprising the step of cooling external components of the gas turbine engine with the cooling air flow before the cooling air flow goes through the oil cooler.

21. The method according to claim 19, further comprising the step of discharging the cooling air flow through an exhaust opening of the gas turbine engine, the exhaust opening also discharging an exhaust flow of the turbine section of the gas turbine engine.

* * * * *

UNITED STATES PATENT AND TRADEMARK OFFICE
CERTIFICATE OF CORRECTION

| | | |
|---|---|---|
| PATENT NO. | : 7,231,767 B2 | Page 1 of 1 |
| APPLICATION NO. | : 10/825138 | |
| DATED | : June 19, 2007 | |
| INVENTOR(S) | : Michael Owen Whiting | |

It is certified that error appears in the above-identified patent and that said Letters Patent is hereby corrected as shown below:

In the claim:

claim 3, column 4, line 29, delete "a gas turbine engine" insert --the APU--
claim 7, column 4, line 44, delete "a gas turbine engine" insert --the APU--
claim 9, column 4, line 52, delete "a gas turbine engine" insert --the APU--
claim 10, column 4, line 54, delete "a gas turbine engine" insert --the APU--

Signed and Sealed this

Twenty-seventh Day of November, 2007

JON W. DUDAS
*Director of the United States Patent and Trademark Office*